March 24, 1959 — M. O. HEMNESS — 2,878,634
IDLER PULLEY CLUTCH FOR COMBINE HEADER BELT
Filed Sept. 28, 1955 — 2 Sheets-Sheet 1

Milton O. Hemness
INVENTOR.

BY Clarence A. O'Brien
and Harvey B. Jackson
Attorneys

March 24, 1959
M. O. HEMNESS
2,878,634
IDLER PULLEY CLUTCH FOR COMBINE HEADER BELT
Filed Sept. 28, 1955
2 Sheets-Sheet 2
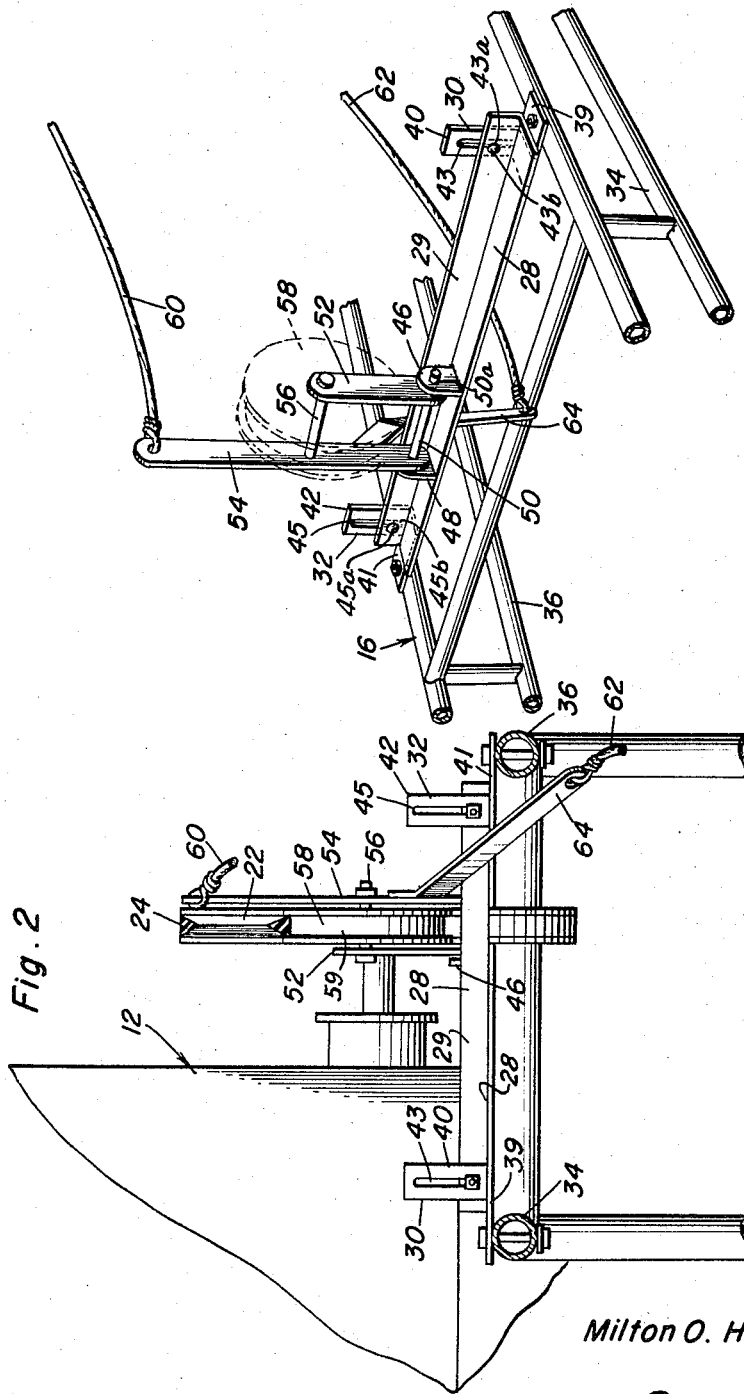
Milton O. Hemness
INVENTOR.

United States Patent Office
2,878,634
Patented Mar. 24, 1959

2,878,634

IDLER PULLEY CLUTCH FOR COMBINE HEADER BELT

Milton O. Hemness, Hawley, Minn.

Application September 28, 1955, Serial No. 537,237

2 Claims. (Cl. 56—122)

This invention relates to clutches, and particularly to an idler pulley clutch arranged operatively with a combine header belt.

An object of this invention is to provide an idler pulley clutch for a combine header belt, the clutch being operable from the seat of a tractor which draws the combine through the field, by manipulation of a pair of ropes, whereby the clutch is instantaneously operable by the operator of the tractor, without the necessity of the tractor operator dismounting.

When a combine is in normal operation and a stone or other obstacle is picked up by the conveyor, the tractor operator must stop the tractor, quickly jump from the tractor and run to the combine in order to stop the operation of the auxiliary engine thereon. By this time, if the obstacle is a stone, it has already been moved into the combine and causes damage to the cylinder or other parts. Accordingly, an object of this invention is to provide means which are operable from the seat of the tractor for instantaneously disconnecting the drive between the combine auxiliary engine which powers the combine and particularly the header and pick-up wherein the stone or other obstacle may be removed before it has had an opportunity to cause any damage of a material nature.

A further object of this invention is to provide means for so disengaging the operative parts of a combine, which means are mechanically simple but yet are very effective in that they introduce substantially no power losses in transmitting the torque from the engine to the driven parts of the combine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged sectional view taken substantially on the line 2—2 of Figure 1 and in the direction of the arrows; and Figure 3 is an enlarged fragmentary perspective view of a portion of the idler pulley clutch.

Figure 1:
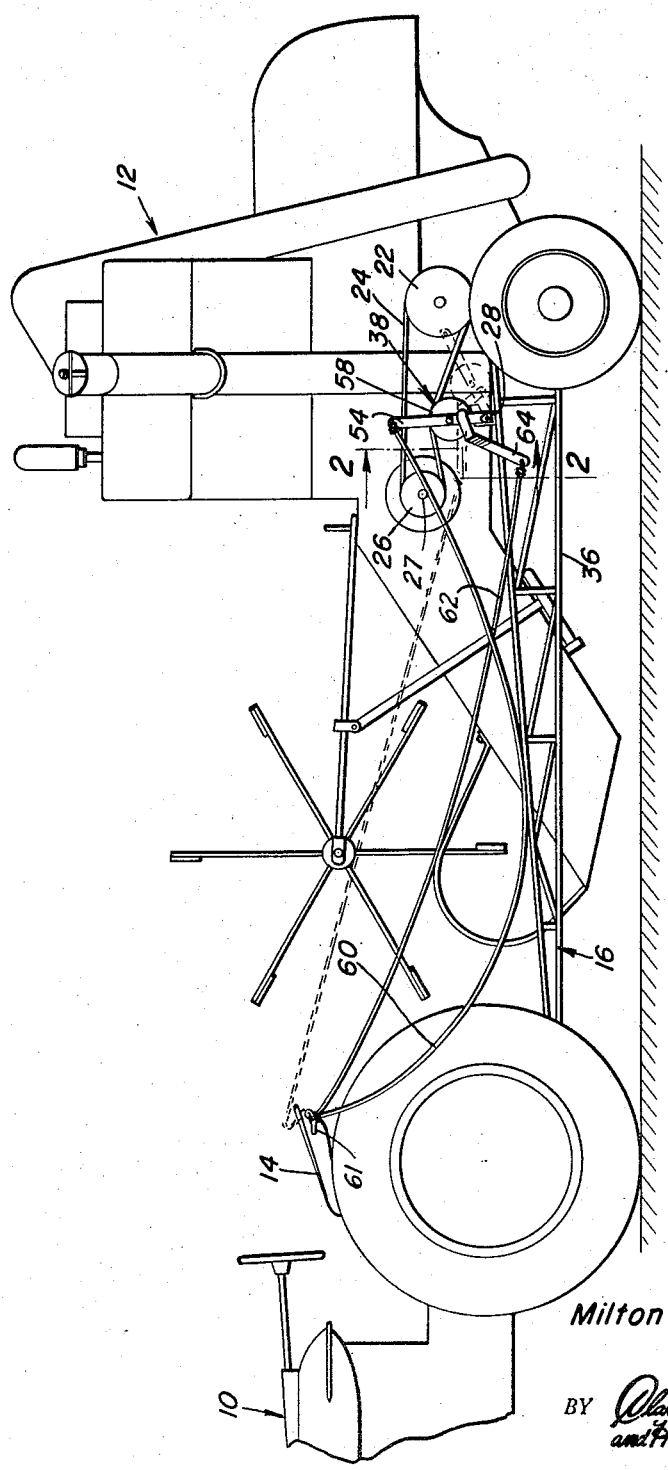
Figure 1 is a side view of a standard combine and a fragmentary view of a tractor drawing this combine through a field, the combine and tractor having applied thereto an embodiment of the invention making it possible to releasably break the driving connection between the auxiliary engine of the combine and the working parts thereof.

In the accompanying drawings, there is a tractor fragment 10 having a drawbar (not shown) and other structural parts, such as seat 14. The combine 12 adapted to be drawn by a tractor through a field, is connected to the drawbar by standard means. Combine 12 is of standard construction and includes a draft 16 coupled to the tractor drawbar, the draft being made of angle iron, tubular stock or other metal. The auxiliary engine (not shown) of the combine drives a pulley 22 around which belt 24 extends, the latter extending also around a pulley 26 that is secured to a shaft 27 from which power is derived to operate the pick-up conveyor, header and other parts.

An angle support 28 is mounted on brackets 30 and 32, the latter being secured to the sides 34 and 36 of the draft 16. Brackets 30 and 32 are used so that the support 28 may be adjusted vertically in order to position the clutch 38 in proper position with respect to the header belt 24. The brackets are made of right angular flat portions, as at 39 and 40 for the bracket 30 and at 41 and 42 for the bracket 32. Flat portions 40 and 42 have slots 43 and 45 therein accommodating bolts 43a and 45a, the latter being threaded in tapped openings 43b and 45b in one flange of the angle support 28. Portions 39 and 41 of the brackets 30 and 32 are secured to the sides 34 and 36 of the draft.

A pair of ears 46 and 48 are secured to the support 28 and a spindle 50 extends through aligned apertures 50a therein. Arms 52 and 54 are fixed to spindle 50, and axle 56 is secured to arms 52 and 54 at the outer end of one of the arms and intermediate the ends of the other. An idler pulley 58 is mounted for rotation on the axle 56 and has preferably a flat belt contacting surface 59 inasmuch as it is adapted to ride on the outer flat surface of the V-belt 24.

A control rope 60 is secured to the outer end of the arm 54 and to a bracket 61 on the back of seat 14 on the tractor. The rope 60 may be secured to another convenient part of the tractor in lieu of the seat, this being a matter of choice and expediency so long as the rope 60 is readily accessible to the operator of the tractor without having to dismount therefrom. Another control rope 62 is similarly secured to the tractor and to the outer end of an arm 64 that is welded or otherwise rigidly secured to the arm 54. Spindle 50 establishes an axis about which the pulley 58, its axle 56 and arms 52 and 54 are displaced in response to pulling the rope 60. Accordingly, the arm 54 is arranged on one side of the axis of the spindle 50, while the arm 64 has its end on the other side of the same axis. Therefore, pulling the control rope 62 will restore the pulley 58 and its associated parts after they have been displaced by the pulling force applied to rope 60.

In operation, the combine 12 is drawn through a field in order to harvest the crop in the customary manner. When an obstacle, such as a stone, is encountered, and it begins to enter the working parts of the combine through the header and combine intake conveyor, the tractor operator quickly reaches behind him and pulls the rope 62, which laterally displaces the pulley 56 about the longitudinal axis of the spindle 50. Such movement (see Figure 1) separates the pulley 58 from the header belt 24 so that the belt slips. Then, the tractor operator retrieves the stone or other obstacle and discards it. After again mounting the tractor, the operator pulls the rope 60 returning the pulley 58 and its supporting arms, axle and other structure to such position that it firmly contacts the outer surface of the header belt 24. When in the header belt contacting position, power is transmitted from the engine pulley to the header and pick-up conveyor drive pulley.

Arms 52 and 54, while holding the pulley 58 firmly pressed against header belt 24, are slightly over a vertical center position with respect to the longitudinal axis of spindle 50. The direction of movement of the header belt 24 over the periphery of pulley 58 holds the pulley 58 in the position disclosed in Figure 1, that is, with the arms 52 and 54 abutting the vertical flange 29 of the angle support 28, whereby a limit for the pivotal movement of these arms is established.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a combine which has a header belt engaging spaced pulleys, a frame attached to a tractor for pulling the combine through a field, and a seat on said tractor, the improvement comprising an idler pulley clutch for said header belt, said clutch comprising a support secured to said frame, two upstanding parallel arms pivotally connected to said support, a shaft connected between said arms, an idler pulley rotatably mounted on said shaft, said pulley being in frictional driving engagement with said belt when said arms are perpendicular to said support, force transmitting means attached between a point on one of said arms remote from said pivotal connection and a location proximate to the seat of said tractor for causing a first rotational movement of the arm shaft and idler pulley about said pivotal connection whereby said pulley and said belt may be engaged for their driving engagement, an extension on one of said arms extending in a direction diametrically opposed to said arms in respect to said pivotal connection, force transmitting means attached between a point on said extension remote from said pivotal connection at a location proximate to the seat of said tractor for causing second rotational movement of the arms, shafts, and idler pulley about said pivotal connection whereby said pulley and said belt may be disengaged from their frictional driving.

2. The combination of claim 1 wherein said support is vertically adjustably mounted on said frame for adjusting the frictional drive between said pulley and said belt.

References Cited in the file of this patent

UNITED STATES PATENTS

| | | |
|---|---|---|
| 1,948,895 | Welty | Feb. 27, 1934 |
| 2,306,755 | Ronning | Dec. 29, 1942 |
| 2,461,391 | Osterhaus | Feb. 8, 1949 |
| 2,732,676 | Bernier | Jan. 31, 1956 |
| 2,777,269 | Uden | Jan. 15, 1957 |